United States Patent Office 3,244,696
Patented Apr. 5, 1966

3,244,696
EXTRACTION OF ALKALOIDS FROM PLANTS OF GENUS HOLARRHENA
Jean Louis Paul Mainil, Watermael-Boitsfort, Belgium, assignor to Societe Anonyme Oletta, Luxembourg, Luxembourg
No Drawing. Filed Feb. 15, 1960, Ser. No. 8,486
2 Claims. (Cl. 260—236)

My present invention is concerned with new alkaloids and other new compounds and processes for obtaining the same and relates more particularly to new industrial and pharmaceutical products of alkaloids and other products isolated from plants of the genus Holarrhena (Apocynaceae) and particularly of the species *H. africana* and *H. floribunda*.

Investigation has made it possible to confirm that these new compounds which are found in combined form in the leaves and inflorescences of the above-indicated plants are different from those found in the cortices of their stems or roots.

The possibility of using such raw material enables the same trees to be exploited indefinitely, in contrast to the use of trunk bark or root cortices whereby the tree is almost invariably destroyed.

The invention is also concerned with a process for obtaining these products, which takes into account that these substances are on the one hand combined with one another and with chlorophyll or with derivatives of the latter, and on the other hand also with triterpens and substances of decomposition of the tannoids.

These alkaloids are important because of their actual qualities, but also because they can serve as starting materials or intermediates for the manufacture of other steroid and cortico-steroid molecules, or other chemical compounds.

According to one embodiment of the invention, the crushed or broken leaves are extracted in, for example, a percolator, an apparatus of the Soxhlet type or a rotary extractor, with an acidified alcohol, such as methanol containing 2% acetic acid, the resulting solution is evaporated, water is then added, and the solution then left standing.

The invention is further illustrated by the following examples:

Example 1

By way of example, 1000 g. of crushed leaves of *Holarrhena africana* are percolated with 7000 cc. of methanol containing 2% acetic acid. The resulting solution is then evaporated in vacuo until its volume is reduced to 1000 cc. Water and alcohol are then added to obtain a methanol containing acetic acid which has an alcohol content of 60% This is left standing for 12 hours.

Filtration is then carried out, during which the coagulate comprising the chlorophyll, the rubbers and the triterpenes and especially substances of decomposition of the tannoids is separated. This insoluble material is constituted of a substance which does not react mercuric iodide but does react well in the Liebermann reaction; after purification, its melting point is 245° C. It is denoted as principle A.

The filtrate is then made alkaline with ammonia and extracted with a solvent, for example methylene chloride. In the case of Example 1, the quantity of methylene chloride is 750 cc. The extract comprising the solvent and the alkaloid bases is evaporated.

The bases freed from solvent, that is to say, methylene chloride in the case in question, are agitated with a solvent such as, for example, petroleum ether. They thus pass into the solvent, which leaves a mass of residues, this being then purified in the form of oxalate.

The petroleum ether is evaporated and the bases are redissolved in benzene or another suitable solvent; the latter is introduced into a chromatographic column of, for example, alumina, silica or an ion exchanger; eluants separate the adsorbed principle successively.

The residues constitute the total alkaloids; these are taken up in dry benzene and crystallization then immediately occurs (about 6 g. per kg. of plant material). It is a first alkaloid; we denote it alkaloid B (togholamine).

The characteristics thereof are as follows:
Empirical formula $C_{10}H_{13}N_5$.
M. Pt. 222–223° C.
M. Pt. of hydrochloride 225–227° C.
$[\alpha]_D = 0°$ (methanol, c.=0.6). The infra-red spectrum shows the presence of C=N bands. Toxicity LD 100 on guinea pigs by the Knaffl-Lenz method=40.5 mg./° K.

The alkaloids soluble in benzene are then fixed on an alumina column in a proportion of 1/30 by weight.

Elution with a benzene-ether releases an alkaloid C with a steroid structure (holaphylline) which crystallizes from methanol. The characteristics thereof are:
Empirical formula $C_{22}H_{35}ON$.
M. Pt. of base 128° C.
M. Pt. of hydrochloride 251° C.
$[\alpha]_D$ of the hydrochloride $+34°$ (methanol, c.=1%). The infra-red spectrum shows a C=O band at 5.95 and an NH band in the region of 3.

The substance is 3-β-methylamino-20-oxopregnane-5-ene and its structural formula is

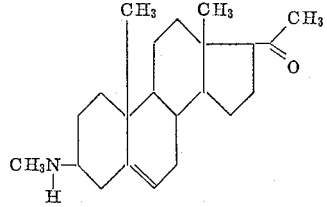

Elution with chloroform causes the appearance of a mixture of alkaloids.

Elution with methanol releases in alkaloid D (holaphyllamine) whose characteristics are:
Empirical formula $C_{21}H_{33}ON$ with steroid structure.
M. Pt. of base 260° C.
M. Pt. of hydrochloride ±340° C.

The infra-red spectrum of the hydrochloride of this alkaloid shows the presence of a C=O band at 5.95 and an NH band at 3. It is probably the non-methylated form of the alkaloid C.

The mixture of alkaloids eluted with chloroform is again treated in an alumina column (25 times the weight); after evaporation to dryness and taking up in benzene, elution with ether causes the discharge of an alkaloid E (holamine) whose characteristics are:
Empirical formula $C_{21}H_{33}ON$.
M. Pt. 134° C.
M. Pt. of hydrochloride 270° C.
$[\alpha]_D +22.6°$. C band at O to 1698 cm.$^{-1}$. $NH_3$ band (primary amine) at 2047 cm.$^{-1}$.

These new compounds can be used as starting materials for the production of known or novel steroidal and other products; for example the production of progesterone by deamination with (1) hypochlorous acid or (2) N-chlorosuccinimide, as illustrated in Example 2.

Example 2

(1) A solution of 2 g. of alkaloid C dissolved in 300 cc. of $CH_2Cl_2$ is filtered and 0.400 g. of HOCl, 0.180 g. of Na and 150 cc. of ethanol are added thereto. The mixture is stirred for one hour at a temperature between 0 and 8° C. It is then evaporated to dryness and 2.300 g. of the chloramine are obtained. This is boiled under reflux for 50 minutes with 120 cc. of éthanol and 2 g. of sodium. The solution is then poured into 2 litres of 1% H₂SO₄ and is left standing for 24 hours and thereafter centrifuged. The precipitate is dissolved in 300 cc. of $CH_2Cl_2$. The solution is washed three times with 75 cc. of water. The solution is then dried over $Na_2SO_4$ and evaporated to dryness, whereby approximately 1.400 g. of crude progesterone is obtained.

(2) 2 g. of alkaloid C are dissolved in 150 cc. of $CH_2Cl_2$ and the solution is stirred for 1 hour at a temperature from 0 to 8° C. while adding 1 g. of N-chlorosuccinimide in small portions.

The solution is then washed three times with 1000 cc. of water and dried over $Na_2SO_4$. It is evaporated to dryness at a temperature of about 40° C. in vacuo, and 2.400 g. of the chloramine are obtained. The further procedure is then as in Example 2(1).

Instead of methanol, as provided above, it is possible to employ ethanol or chloroform, or a mixture of ethanol and chloroform. The therapeutic activity of the novel compounds is as follows.

*Alkaloid B.*—On a cat treated with chloral, this alkaloid shows a respiratory analeptic activity and a hypotensive action of relatively long duration.

Used on rats at 20 mg./kg., a slight tranquilization is obtained, while with a dose of 80 mg./kg., a state of hyperexcitability is obtained.

This alkaloid is distinguished by the fact that it has the advantage of being used as a psychotonic or psycholeptic substance, depending on the doses employed.

*Alkaloid C.*—This alkaloid has no action whatsoever on the gonades but it stimulates the suprarenal glands. It is endowed with an anti-inflammatory action of the same order as that of cortisone. It synergizes the action of cortisoine from an anti-inflammatory and glycogenopexic point of view.

The acute toxicity when injected intravenously into a mouse places the LD 50 in the region of 30 mg./kg.

*Alkaloid E.*—The acute toxicity when injected intravenously into a mouse places the LD 50 between 35 and 40 mg./kg. When administered in the same way to a guinea pig, the LD 50 is 93 mg./kg. Its anti-inflammatory action is about two times stronger than that of cortisone.

Another method of obtaining the compounds of this invention consists in crushing the leaves with or without inflorescences and in rendering them alkaline with an ammoniacal solution, sodium carbonate solution or a solution of another alkali. The plants are left in contact with the alkali solution for about 8 hours and are then extracted in an apparatus of the Soxhlet type, a mixing apparatus, a screw-type or chain-type counter-current extractor, a rotary extractor or a percolator with a solvent such as ethyl acetate, ether, benzene, methylene, chloride or another chlorinated or other solvent.

After complete extraction of the plant with one of these solvents or with a mixture thereof, the extract is agitated with a solution of acetic acid, hydrochloric acid or any other acid which is sufficiently strong to displace the principles combined with chlorophyll and, for this purpose, the acid concentration should be at least 25%.

The emulsion of solvents and acids is dissociated by filtration; thus, for example, the water is separated from the solvent. The later can be placed in a receptacle with any residue remaining on the filter.

These solutions, including the substances in suspension, are then rendered strongly alkaline by the addition of ammonia or soda so as to separate the basic principles and alkaloids from the non basic principles.

The extraction of the alkaloids is then carried out as explained above.

There will now be given one detailed example of the case in which use is made of acetic acid.

*Example 3*

1000 g. of crushed leaves of *Holarrhena africana* are rendered alkaline with 1000 cc. of water containing 2% of ammonia gas and are left standing for 12 hours. Extraction is then carried out on a Soxhlet apparatus with 5000 cc. of ethyl acetate for 8 hours. The extract is then evaporated down to a volume of 750 cc. 100 cc. of 80% acetic acid are then added and the remaining ethyl acetate is therafter driven off. A mixture of methanol and water of 60° is then added and the further procedure followed is that indicated in Example 1, extraction being effected with 750 cc. of methylene chloride after the ammonia alkalization treatment, the methylene chloride being evaporated, this giving the same bases which can be isolated by ion-exchange chromatography.

In Example 3, methylene chloride can be used as extraction solvent instead of ethyl acetate and, instead of using ammonia for the alkalization, it is possible to use 10% sodium carbonate, 5% NaOH or 10% milk of lime.

One feature of carrying out the process exists in the use of oxalic acid.

In this case, the chlorophyll and the rubber remain in the filtrate, while the oxalates of the alkaloids which are formed, so well as the ursolates or certain salts of triterpenic acids, form crystals which are retained on the filter.

The oxalates, ursolates or other salts of triterpenic acid are treated with a solution of an alkali which is sufficiently strong to dissociate the ursolates. After vigorous stirring, methylene chloride is added, this extracting the alkaloids. The methylene chloride extract is washed with water and is then evaporated to give the bases ready for chromatography.

The following Example 4 illustrates the use of oxalic acid.

*Example 4*

1000 g. of *Holarrhena africana* leaves are rendered alkaline with 1000 cc. of water containing 100 g. of sodium carbonate and 10 g. of NaOH. After standing for 12 hours exposed to air, the mass is extracted with methylene chloride for 8 hours in an apparatus of the Soxhlet type.

The methylene chloride is then concentrated to a total volume of 1000 cc., to which acetone saturated with oxalic acid is then added to bring the pH value to 4. The mixture is then left to stand for 24 hours, whereafter the oxalates thus formed and also the triterpenic acids are filtered off. The chlorophyll and the rubber will remain in the filtrate.

*Example 5*

The procedure is as in Example 4, but hydrochloric acid is used. In this case the alkaloids pass into the water without crystallizing.

The acid liquids are then fixed on an Amberlite IR–100 ion-exchange column ("Amberlite" is a registered trademark). Elution is then effected progressively with ammoniacal ethanol of a concentration of 2, 4, 8, 10 and 15% respectively.

In this way, the alkaloids C, D and B are obtained successively in that order.

One important characteristic is that for dissociating the alkaloids of the triterpenic acids, use is made of a strong alkali of a concentration of about 25% (solution of 10% soda or 25% milk of lime), this being effected in the vegetable material, or in this material and also at a later stage, this treatment in the later stage being carried out principally when oxalic acid is used.

*Example 6*

The mixture of all the bases in benzenic solution are subjected to chromatography on 50 parts by weight of neutral alumina prepared as follows:

The alumina, degree III, is placed in N/100 aqueous hydrochloric acid and stirred for one hour. It is then decanted and washed by immersion in distilled water until there is a negative chloride reaction to silver nitrate. The alumina is then dried for 48 hours at 120° C. until the water content is less than 0.25%.

The alumina is then placed in a column, wherein the alumina must reach a height of at least 75 cm. The benzenic solution of the total alkaloid bases, but of which the alkaloid B crystallizing in this solvent will have been centrifuged out, is then fixed on the column.

Benzene is passed through until all the alkaloids are fixed on the alumina. When elution is effected with benzene, ether 80/20, alkaloid E appears in the eluate, the identification characteristics of this alkaloid having been set out above.

Washing with ether-chloroform 50/50 elutes the alkaloid C, whereas the alkaloid can be eluted with chloroform-ethanol 90/10.

Example 7

The procedure is as in Example 6, but using only 25 times the weight of alumina of Broeckman quality.

The yield of alkaloid in admixture leaving with chloroform is greater and chromatography of this mixture enables a better yield of alkaloid E to be obtained.

What I claim is:

1. A process for the preparation of alkaloids of the formulae $C_{10}H_{13}N_5$, $C_{22}H_{35}ON$, and $C_{21}H_{33}ON$ comprising treating at least one member of the group consisting of crushed leaves and inflorescences of plants from the species *H. africana* and *H. floribunda* of the genus Holarrhena (Apocynaceae) with an acidified alkanol, filtering to remove chlorophyll, rubbers, triterpens and substances of decomposition of tannoids and to obtain a filtrate containing said alkaloids, treating the filtrate with an alkali, treating the resulting material with benzene to obtain the alkaloid ($C_{10}H_{13}N_5$) by crystallization, fixing by chromatography the alkaloids soluble in the benzene solvent, eluting said alkaloids respectively with a benzene-ether mixture, chloroform and methanol, to release $C_{22}H_{35}ON$ alkaloid, a mixture of alkaloids, and $C_{21}H_{33}ON$ alkaloid, separating said mixture of alkaloids from each other by fixing on a chromatographic column, and eluting with ether.

2. A process as claimed in claim 1 wherein prior to the acidified alkanol treatment said member is treated with an alkali and extracted by an alcohol, the extract being concentrated and then treated with an acid sufficiently strong to displace the alkaloids combined with the chlorophyll, dissociating the resulting solvent-acid emulsion, rendering alkaline the solution to separate the basic and alkaloid principles from the non-basic principles.

References Cited by the Examiner

FOREIGN PATENTS 18,414  7/1913  Great Britain.

OTHER REFERENCES

Berggren et al.: Acta Chemica Scandinavica, vol. 12 (1958), pages 1521–1527.

Manske: The Alkaloids, vol. 1, pp. 8–14 (1950).

WALTER A. MODANCE, *Primary Examiner.*

IRVING MARCUS, *Examiner.*